(12) United States Patent
Mackey et al.

(10) Patent No.: US 10,955,603 B2
(45) Date of Patent: Mar. 23, 2021

(54) METHOD AND SYSTEM FOR OPTICAL IMAGING USING POINT SOURCE ILLUMINATION

(71) Applicant: Synaptics Incorporated, San Jose, CA (US)

(72) Inventors: Bob Lee Mackey, San Jose, CA (US); Pascale El Kallassi, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 16/161,964

(22) Filed: Oct. 16, 2018

(65) Prior Publication Data

US 2019/0113670 A1    Apr. 18, 2019

Related U.S. Application Data

(60) Provisional application No. 62/573,445, filed on Oct. 17, 2017.

(51) Int. Cl.
*G06K 9/00* (2006.01)
*G02F 1/1334* (2006.01)
*F21V 8/00* (2006.01)

(52) U.S. Cl.
CPC .......... *G02B 6/0016* (2013.01); *G02B 6/0025* (2013.01); *G02F 1/1334* (2013.01); *G06K 9/0004* (2013.01); *G06K 9/00053* (2013.01)

(58) Field of Classification Search
CPC ............... G02F 1/1334; G02F 1/13338; G02F 2001/13756; G06F 21/32; G06F 3/041; G06F 3/0412; G06F 2203/041; G06F 2203/04103; G06F 2203/04112; G02B 6/0016; G02B 6/0025; G06K 9/00053; G06K 9/0004; B32B 2457/208
See application file for complete search history.

(56) References Cited

U.S. PATENT DOCUMENTS

| | | | |
|---|---|---|---|
| 8,917,387 B1* | 12/2014 | Lee | G06K 9/0004 356/71 |
| 2012/0140147 A1* | 6/2012 | Satoh | G03B 21/28 349/62 |
| 2012/0170072 A1* | 7/2012 | Miyazaki | G02B 3/0068 358/1.13 |
| 2012/0258773 A1* | 10/2012 | Alvarez Rivera | G06F 1/1656 455/556.1 |

(Continued)

*Primary Examiner* — Michael H Caley
*Assistant Examiner* — Mariam Qureshi
(74) *Attorney, Agent, or Firm* — Leydig, Voit & Mayer, Ltd.

(57) ABSTRACT

Disclosed are systems and methods for imaging an object. For example, an optical sensor for imaging an input object, comprises: a sensor substrate comprising detector pixels; a scattering layer; a cover layer including a sensing surface, wherein the scattering layer is disposed between the sensor substrate and the cover layer; and, a light source. The optical sensor is configured to: illuminate the light source causing light beams to emanate from the light source to produce an effect of a point light source at the scattering layer; and acquire image data, from one or more detector pixels, of an input object in contact with the sensing surface, wherein the image data corresponds to light from the light source that is reflected at the sensing surface of the cover layer.

21 Claims, 14 Drawing Sheets

(56) References Cited

U.S. PATENT DOCUMENTS

| | | | | |
|---|---|---|---|---|
| 2013/0342664 A1* | 12/2013 | Smith | ............... | H04N 13/302 |
| | | | | 348/58 |
| 2015/0010265 A1 | 1/2015 | Popovich et al. | | |
| 2015/0301400 A1* | 10/2015 | Kimura | ............ | G02F 1/133512 |
| | | | | 349/43 |
| 2017/0075153 A1* | 3/2017 | Chan | .................. | G02F 1/1334 |
| 2017/0257534 A1 | 9/2017 | Huang et al. | | |
| 2019/0064986 A1* | 2/2019 | Lu | ...................... | G06F 3/0414 |
| 2019/0073515 A1* | 3/2019 | Ryu | ................ | G06K 9/00087 |

\* cited by examiner

METHOD AND SYSTEM FOR OPTICAL IMAGING USING POINT SOURCE ILLUMINATION

CROSS-REFERENCE TO RELATED APPLICATIONS

This patent application claims priority of U.S. Provisional Patent Application Ser. No. 62/573,445, filed Oct. 17, 2017, which is hereby incorporated by reference in its entirety.

FIELD

This disclosure generally relates to optical imaging, and more particularly optical imaging using point source illumination.

BACKGROUND

Object imaging is useful in a variety of applications. By way of example, biometric recognition systems image biometric objects for authenticating and/or verifying users of devices incorporating the recognition systems. Biometric imaging provides a reliable, non-intrusive way to verify individual identity for recognition purposes. Various types of sensors may be used for biometric imaging.

Fingerprints, like various other biometric characteristics, are based on distinctive personal characteristics and provide a reliable mechanism to recognize an individual. Thus, fingerprint sensors have many potential applications. For example, fingerprint sensors may be used to provide access control in stationary applications, such as security checkpoints. Fingerprint sensors may also be used to provide access control in mobile devices, such as cell phones, wearable smart devices (e.g., smart watches and activity trackers), tablet computers, personal data assistants (PDAs), navigation devices, and portable gaming devices.

Most commercially available fingerprint sensors are based on optical or capacitive sensing technologies. Unfortunately, conventional optical fingerprint sensors are too bulky to be packaged in mobile devices and other common consumer electronic devices, confining their use to door access control terminals and similar applications where sensor size is not a restriction. As a result, fingerprint sensors in most mobile devices are capacitive sensors having a sensing array configured to sense ridge and valley features of a fingerprint. Typically, these fingerprint sensors either detect absolute capacitance (sometimes known as "self-capacitance") or trans-capacitance (sometimes known as "mutual capacitance"). In either case, capacitance at each pixel in the array varies depending on whether a ridge or valley is present, and these variations are electrically detected to form an image of the fingerprint.

While capacitive fingerprint sensors provide certain advantages, most commercially available capacitive fingerprint sensors have difficulty sensing fine ridge and valley features through large distances, requiring the fingerprint to contact a sensing surface that is close to the sensing array. It remains a significant challenge for a capacitive sensor to detect fingerprints through thick layers, such as the thick cover glass (sometimes referred to herein as a "cover lens") that protects the display of many smartphones and other mobile devices. To address this issue, a cutout is often formed in the cover glass in an area beside the display, and a discrete capacitive fingerprint sensor (often integrated with a mechanical button) is placed in the cutout area so that it can detect fingerprints without having to sense through the cover glass. The need for a cutout makes it difficult to form a flush surface on the face of device, detracting from the user experience, and complicating the manufacture. The existence of mechanical buttons also takes up valuable device real estate.

SUMMARY

One embodiment of the disclosure provides an optical sensor for imaging an input object, comprising: a sensor substrate comprising detector pixels; a scattering layer; a cover layer including a sensing surface, wherein the scattering layer is disposed between the sensor substrate and the cover layer; and a light source. The optical sensor is configured to: illuminate the light source causing light beams to emanate from the light source to produce an effect of a point light source at the scattering layer; and, acquire image data, from one or more detector pixels, of an input object in contact with the sensing surface, wherein the image data corresponds to light from the light source that is reflected at the sensing surface of the cover layer.

Another embodiment of the disclosure provides an electronic device for imaging an input object, comprising a sensor, a memory storing instructions, and a processor. The sensor comprises: a sensor substrate comprising detector pixels; a scattering layer disposed on the sensor substrate, wherein the scattering layer has a thickness that is the same or less than a pitch of the detector pixels; a cover layer, wherein the cover layer is disposed on the scattering layer; and a light source. The processor is configured to be communicatively coupled to the sensor, wherein the processor is configured to execute the instructions to cause the electronic device to: cause light beams to emanate from the light source towards the scattering layer; acquire image data, from one or more detector pixels, of the input object in a sensing region above the cover layer, wherein the image data corresponds to light from the light source that is reflected at a surface of the cover layer; and process an image of the input object from the image data.

Another embodiment of the disclosure provides a method for imaging an input object, comprising: detecting the presence of the input object on a sensing surface of a cover layer of a sensor; illuminating an area of scattering layer of the sensor to produce an effect of a point light source at the scattering layer; acquiring image data, from one or more detector pixels of the sensor, of the input object in contact with the sensing surface, wherein the image data corresponds to light from the area of scattering layer that is illuminated that is reflected at the sensing surface of the cover layer; and processing an image of the input object from the image data.

DETAILED DESCRIPTION

Figure 1:
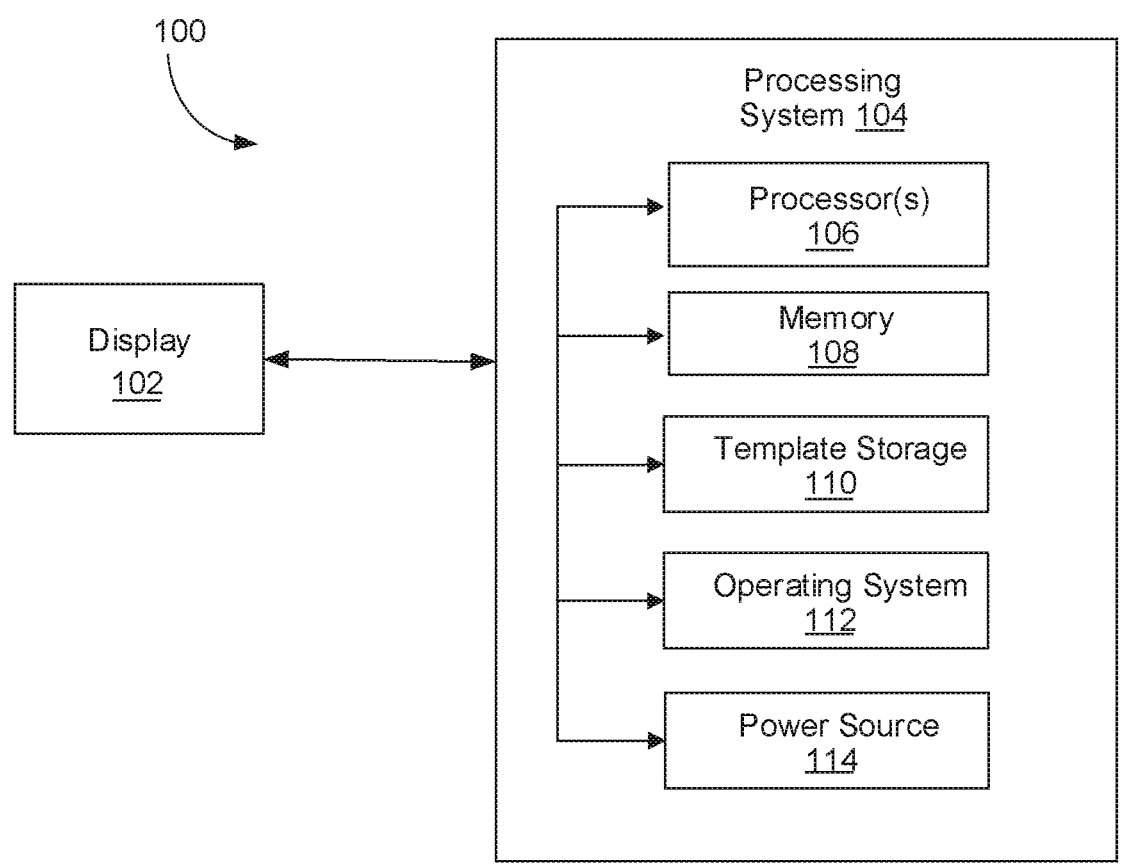
FIG. 1 is a block diagram of an example of an electronic device that includes a display device and a processing system, according to an embodiment of the disclosure.

The following detailed description is exemplary in nature and is not intended to limit the invention or the application and uses of the invention. Furthermore, there is no intention to be bound by any expressed or implied theory presented in the preceding technical field, background, summary, brief description of the drawings or the following detailed description.

As described in greater detail herein, embodiments of the disclosure provide systems and methods to optically image an input object such as a fingerprint. In particular, a method and system is described that achieves high resolution through the use of a small light source, e.g., a point light source or an approximation of a point light source. The disclosed method and system achieve high optical efficiency, and generally eliminate secondary reflections.

Historically, optical fingerprint sensors have been large and bulky. Lenses and prisms have been used to control the illumination and to produce an image of a fingerprint on a sensor. These lenses and prisms conventionally had thicknesses greater than the image size (e.g., 10-20 mm). Recent work has attempted to make a much more compact optical path. One conventional approaches uses collimators to convey the object illumination to the image plane of the sensor. However, systems involving collimators use merely a small fraction of the illumination (~0.1%), therefore, provide relatively low contrast. Other attempts to further reduce the thickness of optical sensors illuminated the sensor module from the side. Illuminating the sensor module from the side increases the range of angles that is captured, resulting in higher magnification and requiring a larger sensor areas. In addition, illuminating the sensor module from the side has the additional drawback that multiple reflections superpose on the sensor, giving confused images.

Further attempts at optical sensing design place the illumination source behind the sensor relative to the object being imaged. This design, however, cannot be easily used when a white paint layer is provided between the sensor and cover glass. Some manufacturers of devices prefer to have a white paint layer across as much of the surface of a device as possible (except for the display area). However, white paint layers and films are known to scatter light. Therefore, when the illumination source is placed behind the sensor in conventional designs, the light would be scattered through the white paint layer above the sensor. For this reason, a gap in the white paint layer, generally of size similar to the area of the sensor, is used in conventional approaches, to allow the light to pass through the gap without scattering. This gap, however, is visible on the otherwise white surface. Providing a featureless white layer is desirable for aesthetic purposes, and cannot be achieved with conventional approaches that place the illumination source behind the sensor.

The disclosed embodiments provide an optical sensor design using a point light source or an approximation of a point light source. The disclosed optical sensor design can be used in conjunction with a white paint or other scattering layer (for example, white or pastel paint, ink, or coating, surface treatment, or textural material layer) over or above the sensor. In one embodiment, an aperture is provided in the white paint layer, and a point light source is disposed so that light from the point light source can pass through the aperture. In other embodiments, no aperture is provided in the white paint layer, a point light source is disposed beneath the white paint layer and directs light at a small area of the white paint layer, which scatters the light towards the object being imaged. Thereby, the light scattered by the white paint layer approximates a point light source. Additional detail and description is provided herein below.

FIG. 1 is a block diagram of an example of an electronic device 100 that includes a display device 102 and a processing system 104, according to an embodiment of the disclosure.

By way of example, basic functional components of the electronic device 100 utilized during capturing, storing, and validating a biometric match attempt are illustrated. The processing system 104 includes a processor(s) 106, a memory 108, a template storage 110, an operating system (OS) 112, and a power source(s) 114. Each of the processor(s) 106, the memory 108, the template storage 110, and the operating system 112 are interconnected physically, communicatively, and/or operatively for inter-component communications. The power source 114 is interconnected to the various system components to provide electrical power as necessary.

As illustrated, processor(s) 106 are configured to implement functionality and/or process instructions for execution within electronic device 100 and the processing system 104. For example, processor 106 executes instructions stored in memory 108 or instructions stored on template storage 110 to identify a biometric object or determine whether a biometric authentication attempt is successful or unsuccessful. Memory 108, which may be a non-transitory, computer-readable storage medium, is configured to store information within electronic device 100 during operation. In some embodiments, memory 108 includes a temporary memory, an area for information not to be maintained when the electronic device 100 is turned off. Examples of such temporary memory include volatile memories such as random access memories (RAM), dynamic random access memories (DRAM), and static random access memories (SRAM). Memory 108 also maintains program instructions for execution by the processor 106.

Template storage 110 comprises one or more non-transitory computer-readable storage media. In the context of a fingerprint sensor, the template storage 110 is generally configured to store enrollment views for fingerprint images for a user's fingerprint or other enrollment information.

More generally, the template storage 110 may be used to store information about an input object. The template storage 110 may further be configured for long-term storage of information. In some examples, the template storage 110 includes non-volatile storage elements. Non-limiting examples of non-volatile storage elements include magnetic hard discs, solid-state drives (SSD), optical discs, floppy discs, flash memories, or forms of electrically programmable memories (EPROM) or electrically erasable and programmable (EEPROM) memories, among others.

The processing system 104 also hosts an operating system (OS) 112. The operating system 112 controls operations of the components of the processing system 104. For example, the operating system 112 facilitates the interaction of the processor(s) 106, memory 108, and template storage 110.

According to various embodiments, the processor(s) 106 implement hardware and/or software to obtain data describing an image of an input object. The processor(s) 106 may also align two images and compare the aligned images to one another to determine whether there is a match. The processor(s) 106 may also operate to reconstruct a larger image from a series of smaller partial images or sub-images, such as fingerprint images when multiple partial fingerprint images are collected during a biometric process, such as an enrollment or matching process for verification or identification.

The processing system 104 includes one or more power sources 114 to provide power to the electronic device 100. Non-limiting examples of power source 114 include single-use power sources, rechargeable power sources, and/or power sources developed from nickel-cadmium, lithium-ion, or other suitable material as well power cords and/or adapters which are in turn connected to electrical power.

Display 102 can be implemented as a physical part of the electronic device 100, or can be physically separate from the electronic device 100. As appropriate, the display 102 may communicate with parts of the electronic device 100 using any one or more of the following: buses, networks, and other wired or wireless interconnections. In some embodiments, display 102 is implemented as a fingerprint sensor to capture a fingerprint image of a user.

Some non-limiting examples of electronic devices 100 include personal computers of all sizes and shapes, such as desktop computers, laptop computers, netbook computers, tablets, web browsers, e-book readers, and personal digital assistants (PDAs). Additional example electronic devices 100 include data output devices (including display screens and printers). Other examples include remote terminals, kiosks, video game machines (e.g., video game consoles, portable gaming devices, and the like), communication devices (including cellular phones, such as smart phones), and media devices (including recorders, editors, and players such as televisions, set-top boxes, music players, digital photo frames, and digital cameras).

Figure 2:
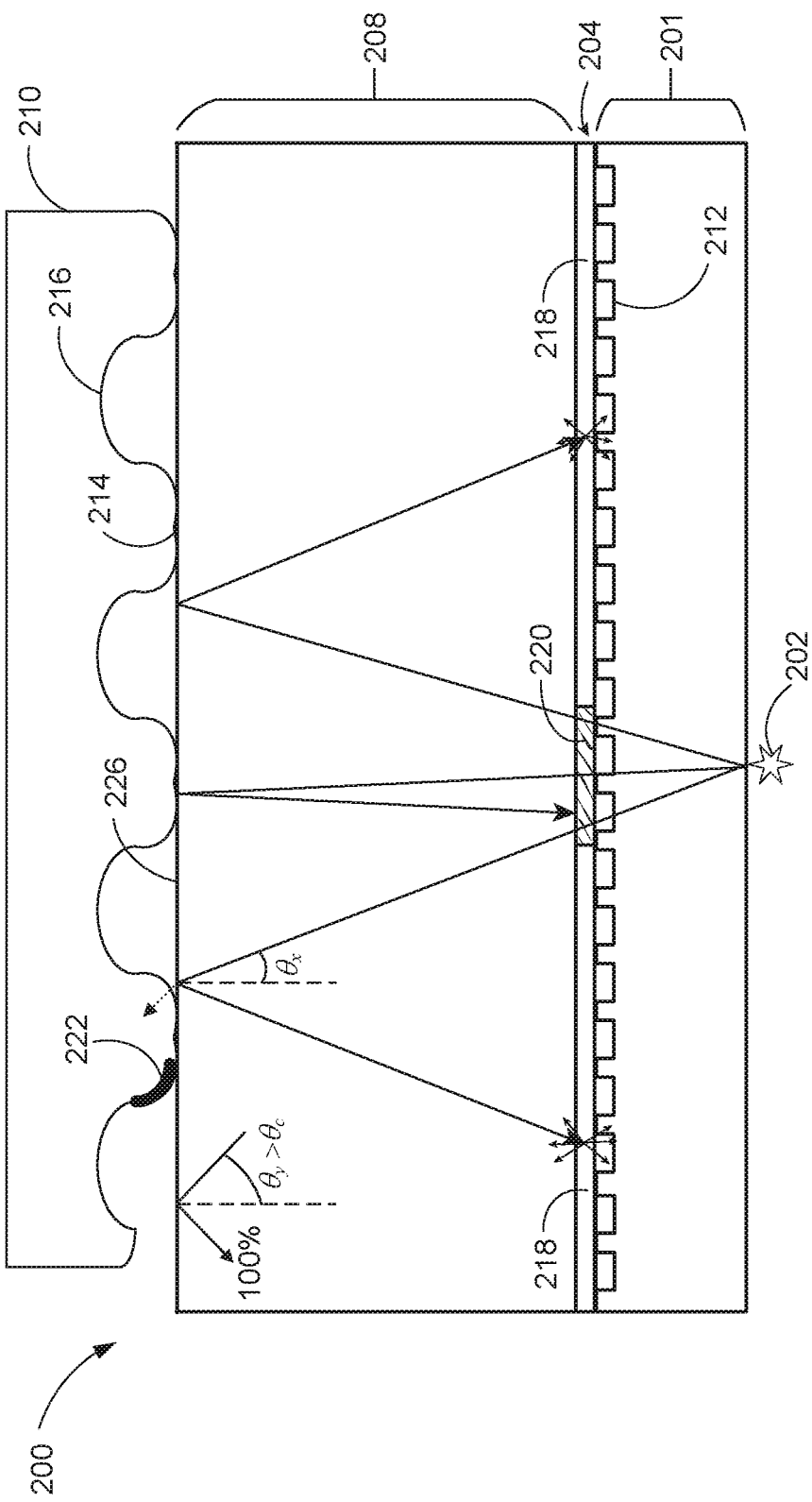
FIG. 2 illustrates an example of an optical sensing system according to the present disclosure.

FIG. 2 illustrates an example of an optical sensing system 200 according to the present disclosure. The optical sensing system 200 includes a sensor substrate 201, a scattering layer 204 (for example, a white paint layer 204), and a cover layer 208. Also shown is an input object 210, which according to the disclosure, and as described in detail below, is imaged by the optical sensing system 200. As described above, the optical sensing system 200 may be a separate device or may be incorporated as part of various devices including mobile phones, media devices, and any other electronic device 100.

The sensor substrate 201 includes detector pixels 212. In general, the detector pixels 212 detect light reflected from the input object 210 to form an image of the input object 210, such as a fingerprint. Examples of types of detector pixels 212 are CMOS sensors, phototransistors, and photodiodes. Thin film transistor sensors may also be used according to the disclosure. In some embodiments, the detector pixels can be approximately 50-90 um×50-90 um.

The cover layer 208 may include a cover lens, also referred to as a cover glass, which protects the inner components of the display, such as the detector pixels 212. The cover lens may be made of any material such as chemically strengthened glass, crystalline materials (e.g., synthetic sapphire), transparent polymeric materials, and the like. The cover layer 208 may also include one or more additional layers associated with display and/or touch screen functionality. The cover layer 208 may be transparent thereby allowing light from display pixels to be transmitted and observed outside of the optical sensing system 200, which may be included in a bezel of the electronic device 100. A top surface of the cover layer 208 forms a sensing surface 226 that provides a contact area for the input object 210.

The input object 210 is an object to be imaged, such as a fingerprint. Generally, the object 210 has various characteristics. By way of example, the object 210 has ridges 214 and valleys 216. Due to their protruding nature, the ridges 214 contact the sensing surface 226 of the cover 208. In contrast, the valleys 216 do not contact the sensing surface 226 and instead form a gap between the input object 210 and the sensing surface 226. The object 210 may have other characteristics such as stain or ink 222 that do not create significant structural differences in portions of the input object 210, but which affect its optical properties.

The scattering layer 204, e.g., white paint layer 204, in FIG. 2 includes white paint portions 218 and an aperture 220. In some embodiments, the scattering layer 204 may comprise pastel paint, ink or coating, surface treatment, or a textural material layer. The white paint layer 204 scatters light incident on the white paint portions 218; whereas light is not scattered when passing through the aperture 220. It should be understood that the white paint layer is not 100% pure white, as a pure white layer would be 100% reflective. Therefore, the white paint layer is approximately 70-90% pure white.

FIG. 2 also shows a light source 202. The light source 202 may be a point light source or an approximation of a point light source, as described in FIGS. 3 and 4A-4B. In the embodiment shown in FIG. 2, the light source 202 is disposed below the sensor substrate 201. In another embodiment, the light source 202 (e.g., an LED (light emitting diode), OLED (organic LED), or micro LED, for example) could be disposed in the same plane as the detector pixels 212. In some embodiments, the micro LED may be about a 50 um cube, whereas the detector pixels 212 may be about 50-90 um×50-90 um and about 1 um thick. In embodiments where the micro LED is placed in the same place as the detector pixels 212, an acrylic layer or film adhesive is placed above the micro LED and detector pixels 212 to provide an even surface, on which the white paint layer is placed.

The light source 202, such as an LED, transmits beams of light through the aperture 220 without scattering. The light beans travel within the cover layer 208. The transmitted light becomes incident on the sensing surface 226 of the cover layer 208 at various angles. At certain angles (e.g., $\theta_x$ in FIG. 2), some of the transmitted light is reflected and some of the transmitted light is refracted. However, light beams transmitted from the point light source 202 that arrive at the sensing surface 226 at an angle exceeding a critical angle $\theta_c$ (e.g., $\theta_y$ in FIG. 2) undergo total internal reflection, i.e., all light (100%) from the transmitted beam is reflected at the sensing surface 226.

As shown, the light beams from the light source 202 travel through the aperture 220 without scattering, reflect from the top of the cover layer 208, and return to the sensor substrate 201. Before reaching the sensor substrate 201, some of the light beams interact with the white paint portions 218 of the white paint layer 204. In these regions, the light is scattered before arriving at the detector pixels 212. In some implementations, light scattered through the white paint payer 204 approximates a Lambertian cosine distribution. However, because the white paint layer 204 is very close to the layer of detector pixels 212, there is little loss of resolution. The scattered photons arrive in a detector pixel 212 very near where they arrive at the white paint layer 204 and are scattered. Hence, in one embodiment, the white paint layer 204 has a thickness that is the same or less than a pitch of the detector pixels. For example, fingerprint imaging may require approximately 100 um or higher resolution. In such implementations, the white paint layer 204 may have a thickness approximately 100 um thickness or less. In addition, light that is reflected back up from the white paint layer 204 and undergoes secondary scattering can reflect (again) from the top surface over the cover layer 208 or the input object 210 and again reach the sensor substrate 201. This secondary illumination may degrade contrast and signal-to-noise ratio (SNR) of the image. However, because the light has scattered and then propagated over some distance, the light does not carry a coherent image, and thus may not interfere with the primary image.

In some embodiments, an optional multi-state layer can be used in the sensor. The multi-state layer may be configured to switch between multiple states, for example, colored and transparent. When the multi-state layer is in the transparent state, optical measurements may be taken. When the multi-state layer is in the colored state, e.g., colored white, the aperture 220 is effectively "hidden" from view, even when located in the bezel area.

In one implementation, the multi-state layer may be implemented using a polymer dispersed liquid crystal (PDLC) film. The PDLC film combines the electro-optical performance of liquid crystals together with structural and mechanical advantages associated with polymers. PDLC film includes micron-sized droplets of liquid crystals in a polymer matrix. Electro-optic re-orientation of the liquid crystal droplets can occur when the PDLC film is subjected to an electric field. The PDLC film can appear white or milky with certain liquid crystal arrangements, such as when the liquid crystals are randomly oriented throughout the PDLC film. In such an arrangement, the liquid crystals highly scatter light incident on the PDLC film. When the PDLC film is subjected to an electric field, the liquid crystal droplets are excited such that they are aligned relative to each other, which allows light to pass through the PDLC film and reduces the degree of optical scattering, giving rise to a transparent state.

For implementations where the optical fingerprint sensors are in the bezel area, a PDLC stackup layer may be added between the cover layer 208 and the sensor substrate 201. The PDLC stackup layer may comprise two transparent conductor layers with a PDLC film sandwiched between the two transparent conductor layers. In the OFF state (when there is no voltage applied between the two transparent conductors), the PDLC film has a colored or opaque appearance; whereas, in the ON state, the PDLC film is transparent. In some embodiments, the switching is timed so that the PDLC layer is transparent when an optical sensor measurement is being taken. In some embodiments, chemical dyes can be added to the PDLC film, so that the PDLC film preferentially scatters light of certain colors, such as red, green, or blue light, for example, allowing the electronic device to show different colors in the bezel area.

In other embodiments, materials having optical properties that can be controlled using, e.g., temperature (i.e., thermochromic materials) or electric fields (i.e., electrochromic materials) can be used. In some embodiments, these materials may have properties that are suitable to hide an aperture of an optical sensor.

Figure 3:
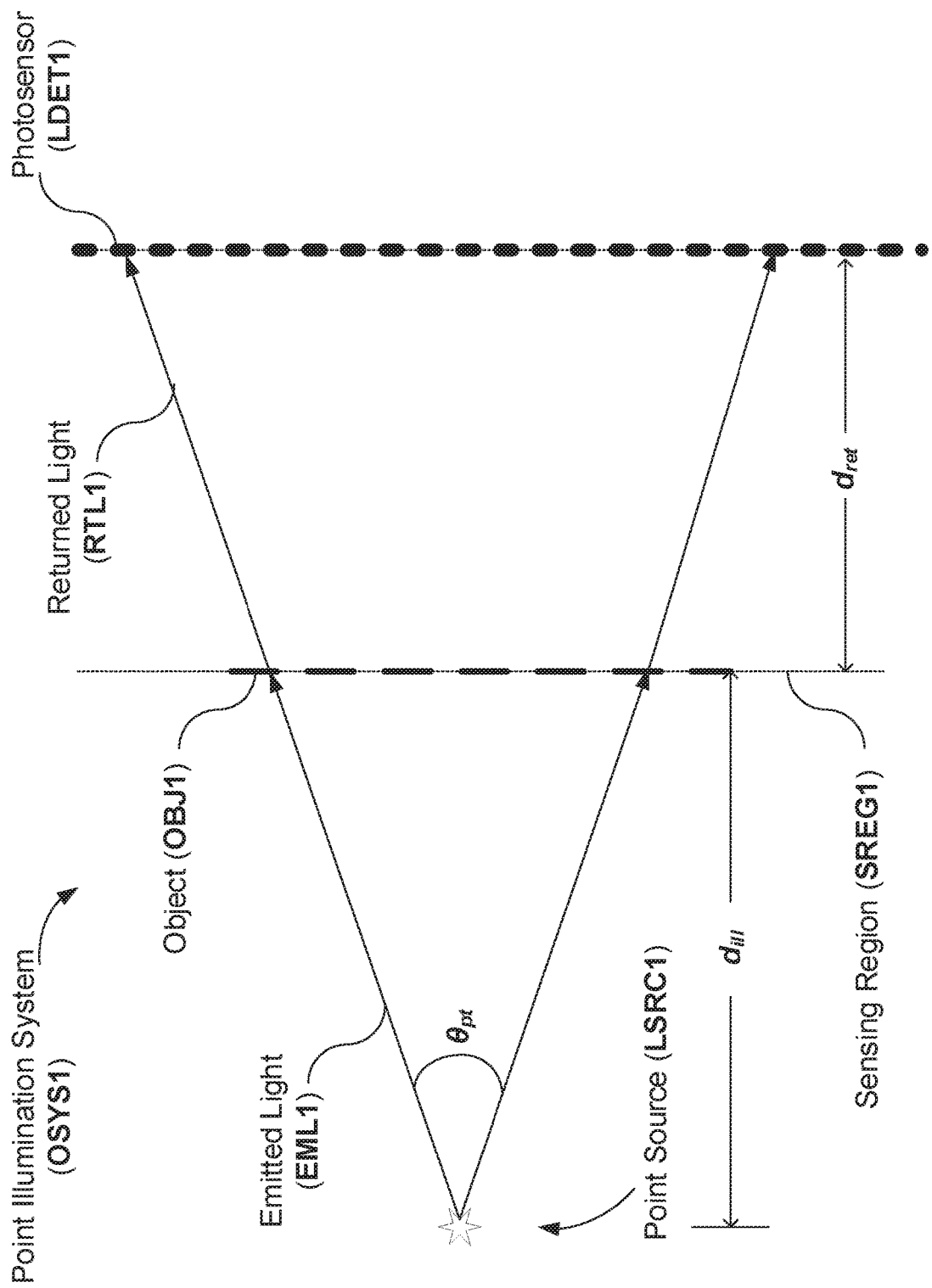
FIG. 3 shows a schematic representation of a point source based optical system in accordance with some implementations.

FIG. 3 shows a schematic representation of a point source based optical system OSYS1 in accordance with some implementations. The light path is shown unfolded so that light propagates from left to right. Emitted light EML1 emitted from the point source LSRC1 passes through a sensing region SREG1 and returned light RLT1 interacts with a photosensor plane LDET1. In one implementation, the sensing region SREG1 comprises a sensing surface of a cover layer. In another implementation, the sensing region SREG1 comprises space above a top surface of the cover, but not in contact with the top surface of a cover layer. Light emitted from the point source LSRC1 diverges at an angle $\theta_{pt}$, but light rays from the emitted light EML1 substantially do not cross over each other to allow for an image to be resolved at the photosensor plane LDET1. In some implementations, the point source LSRC1 is a true point source or approximates a point source sufficiently to resolve a feature of the object OBJ1.

Figures 4A, 4B:
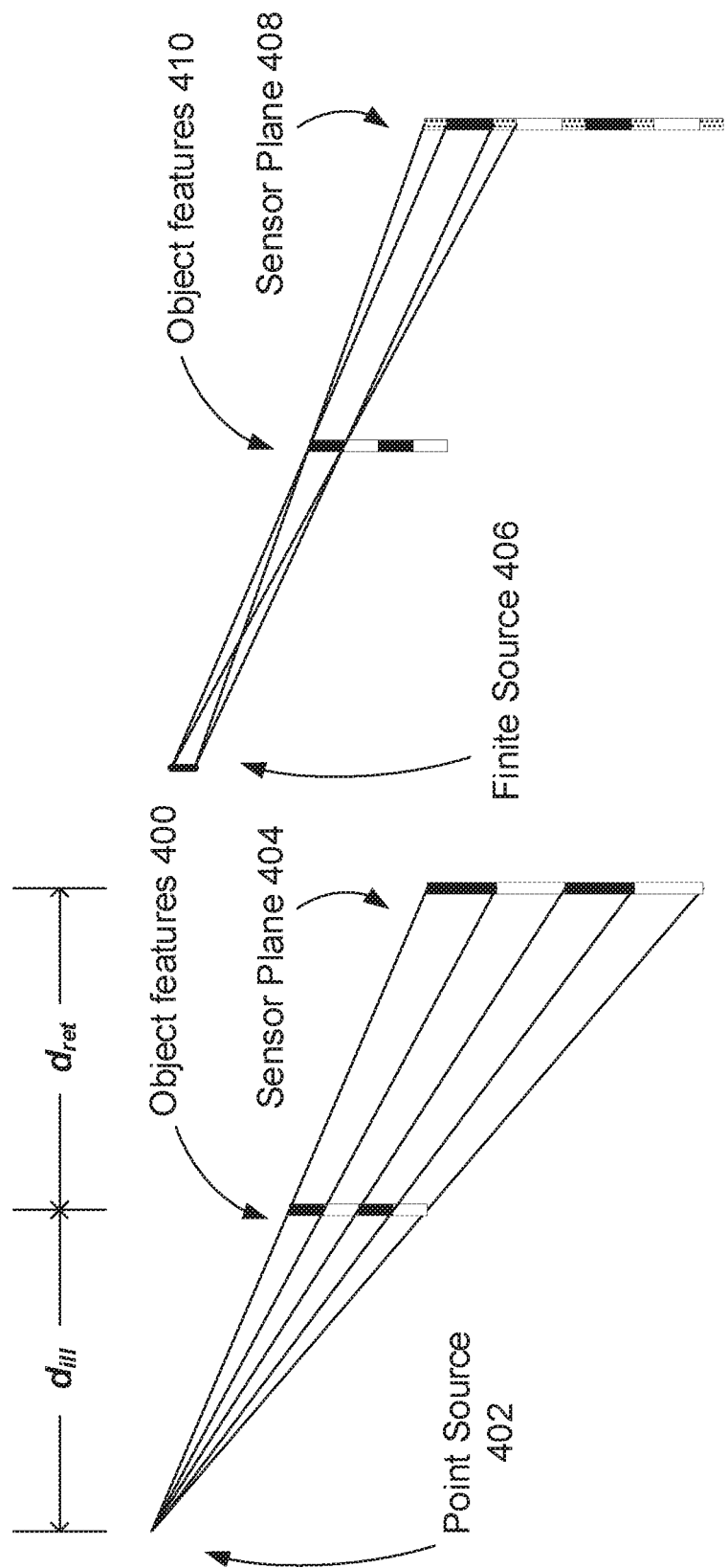
FIGS. 4A-4B shows some schematic examples of point sources for sensing, in accordance with some implementations.

FIGS. 4A-4B shows some schematic examples of point sources for sensing, in accordance with some implementations. In FIG. 4A, an ideal point source 402 is shown and the illumination path ($d_{ill}$) and return optical path ($d_{ret}$) are the same distance, resulting in 2x magnification of the object features 400 at the sensor plane 404. In FIG. 4B, a finite light source 406 or wide cluster of light sources is utilized as a point source. This may result in some blurring at the sensor plane 408, but the object features 410 can still be resolved in the sensor plane 408.

Turning now to the embodiments shown in FIGS. 5-9, there is no aperture included in the white paint layer. In FIGS. 5-9, a light source directs light onto a small area or spot on or in the white paint layer. The white paint layer, i.e., a scattering layer, then scatters the light. The light leaves the scattering layer at a wide range of angles from an illuminated area that mimics or produces the effect of a point light source located at or near the scattering layer. In some embodiments, the pixels closest to the illuminated point may receive too much light from adjacent scattering. If that is the case, then those pixels can be ignored when the image is processed for further analysis. Light leaving the scattering layer interacts with the fingerprint at the top of the cover glass and reflects back down toward the sensor to be captured as a partial image of the fingerprint.

A common characteristic of the designs shown in FIGS. 5-9 is that light is emitted from a small area very close to the scattering layer. The light may arrive at that small area by several methods, as described below.

Figure 5:
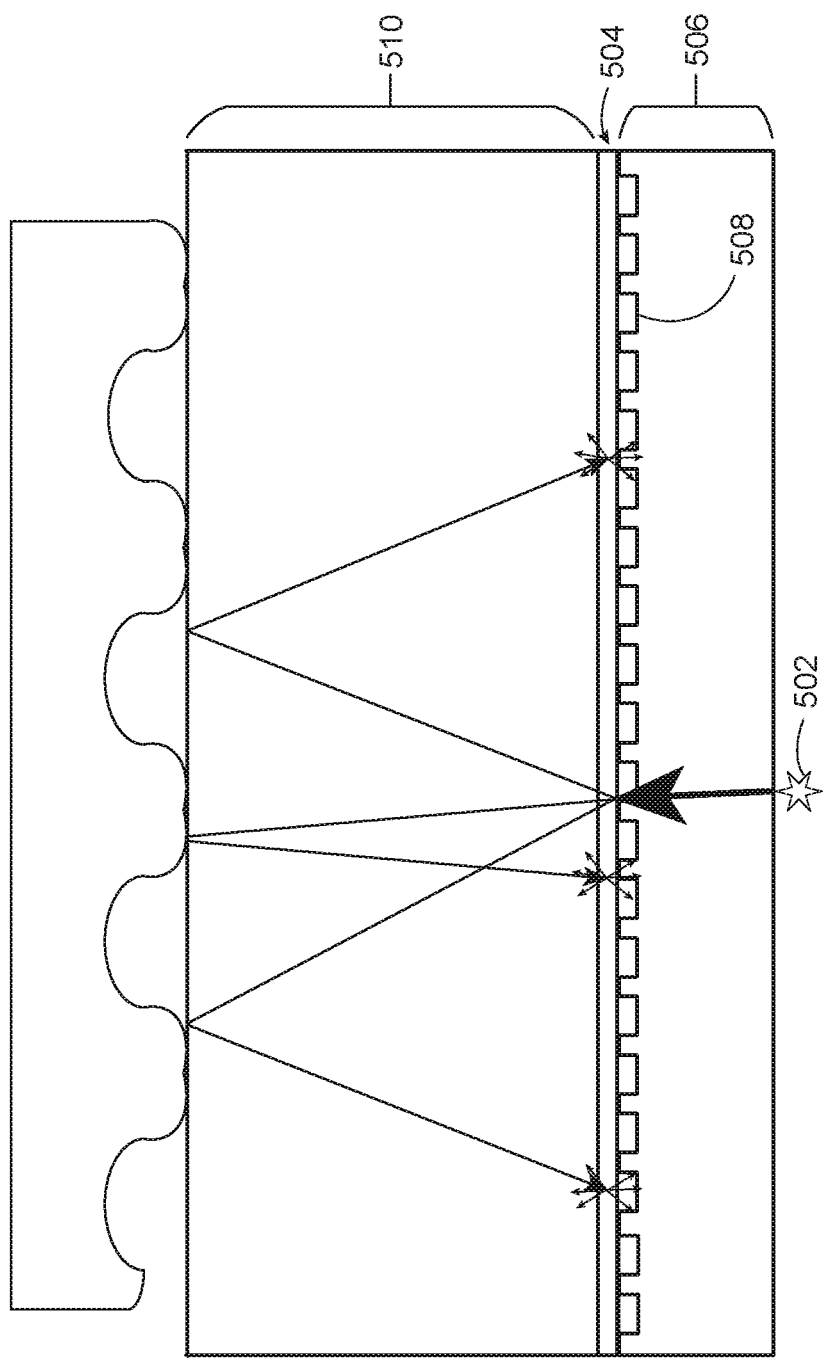
FIG. 5 shows a light source directing light onto a small area of a scattering layer, according to one embodiment.

FIG. 5 shows a light source 502 directing light onto a small area of a scattering layer 504, according to one embodiment. A sensor substrate 506 includes a plurality of detector pixels 508. The scattering layer 504 is disposed between the sensor substrate and a cover layer 510.

The light source 502 can be an LED. The scattering layer 504 can be a white paint layer. The sensor substrate 506 may be configured to have an appropriate thickness to allow the light source 502 to be placed below the sensor substrate 506 such that the light emanating from the light source 502 reaches a small enough area of the scattering layer 504 on which the light is incident, thereby approximating a point light source at the scattering layer 504. Focusing emitted light from the light source 502 or aiming the light source 502 in a particular direction may not necessary in this configuration.

After light from the light source 502 interacts with the scattering layer 504, it may be scattered in various directions, mimicking a point light source at the scattering layer 504. The scattered light beams or rays pass through the cover layer 510, interact with a top surface of the cover layer 510 and return back to the sensor substrate 506. As described above, when the light beams interact with the scattering layer 504 after returning through the cover layer 510, the light is scattered again before arriving at the detector pixels 508. However, because the scattering layer 504 is very close to the layer of detector pixels 508, there is little loss of resolution in the resultant image.

In an alternative embodiment, the sensor substrate 506 may comprise a white material, and the detector pixels 508 are disposed on white material sensor substrate 506. The sensor substrate 506 can be inverted (relative to the orientation shown in FIG. 5), such that the white material sensor substrate 506 is above the detector pixels 508. In such an embodiment, if the white material sensor substrate 506 is of a sufficient thickness (e.g., thin enough), the white material sensor substrate 506 can act as the scattering layer, and no separate scattering layer (i.e., white paint layer 504) is necessary.

Figure 6:
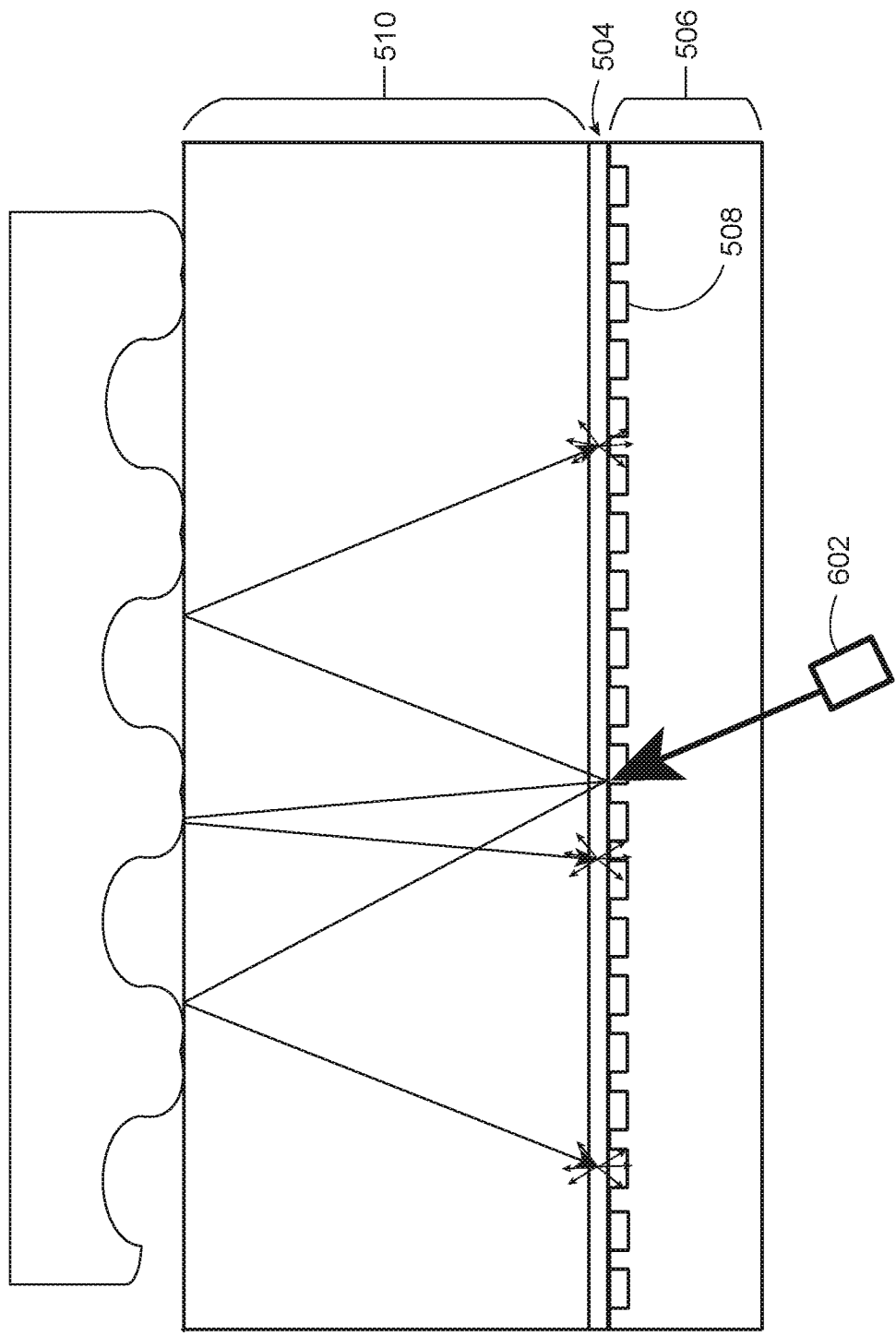
FIG. 6 shows a laser directing a narrow beam onto a scattering layer, according to one embodiment.

FIG. 6 shows a laser 602 directing a narrow beam of light onto a scattering layer 504, according to one embodiment. Elements similar to those shown in FIG. 5 are shown in FIGS. 6-9 and the description is not repeated herein again for brevity. In FIG. 6, the laser 602 may be a vertical-cavity surface-emitting laser (VCSEL) or any other type of laser that provides a narrow beam of light. In the embodiment shown, the laser 602 is below the sensor substrate 506. In another embodiment, the laser 602 may be disposed in another location or in a different orientation, and one or more mirrors may be used to direct light from the laser 602 on a small area of the scattering layer 504.

Figure 7:
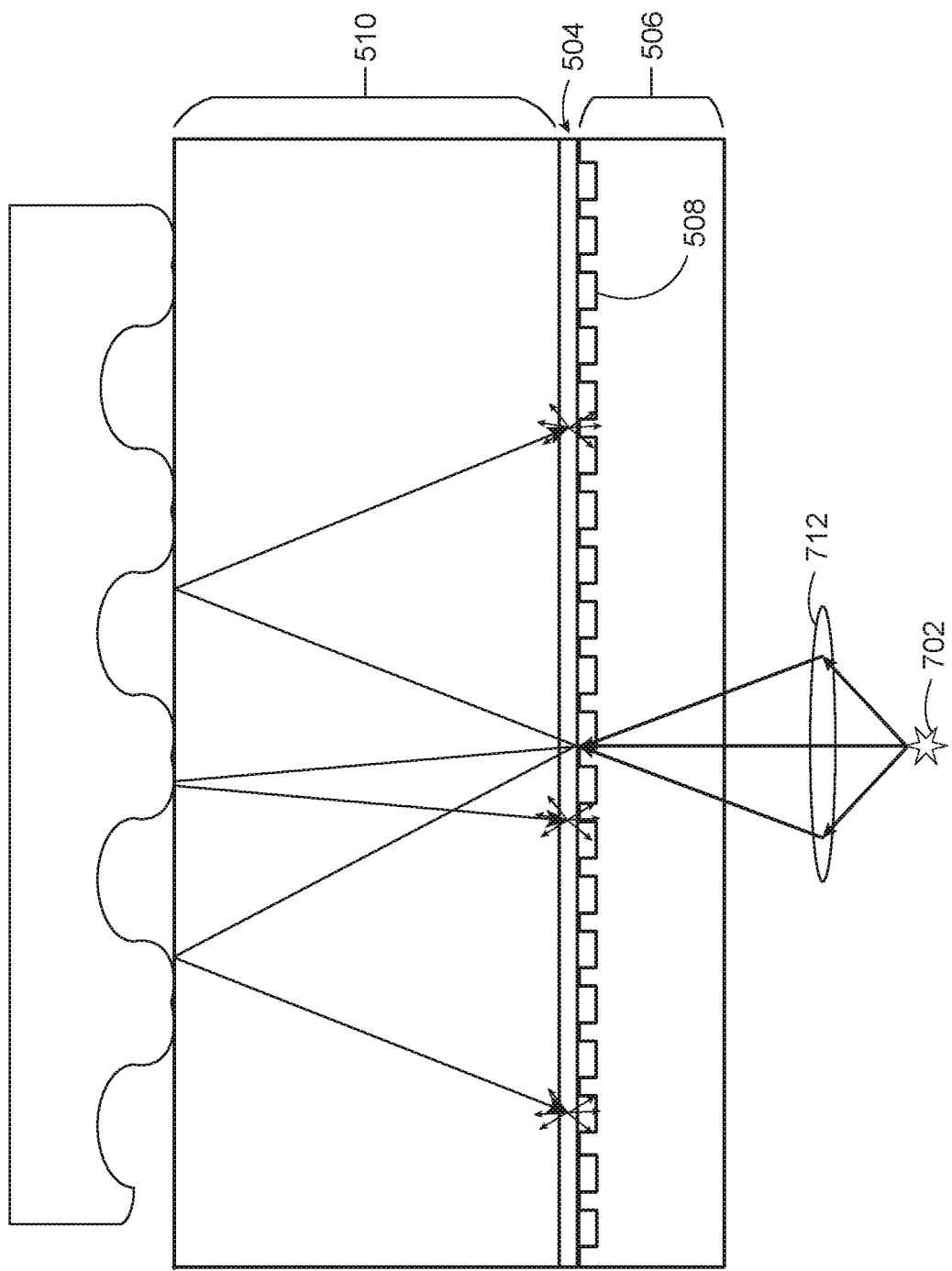
FIGS. 7-8 show light being focused onto the scattering layer with one or more lenses, according various embodiments.
Figure 8:
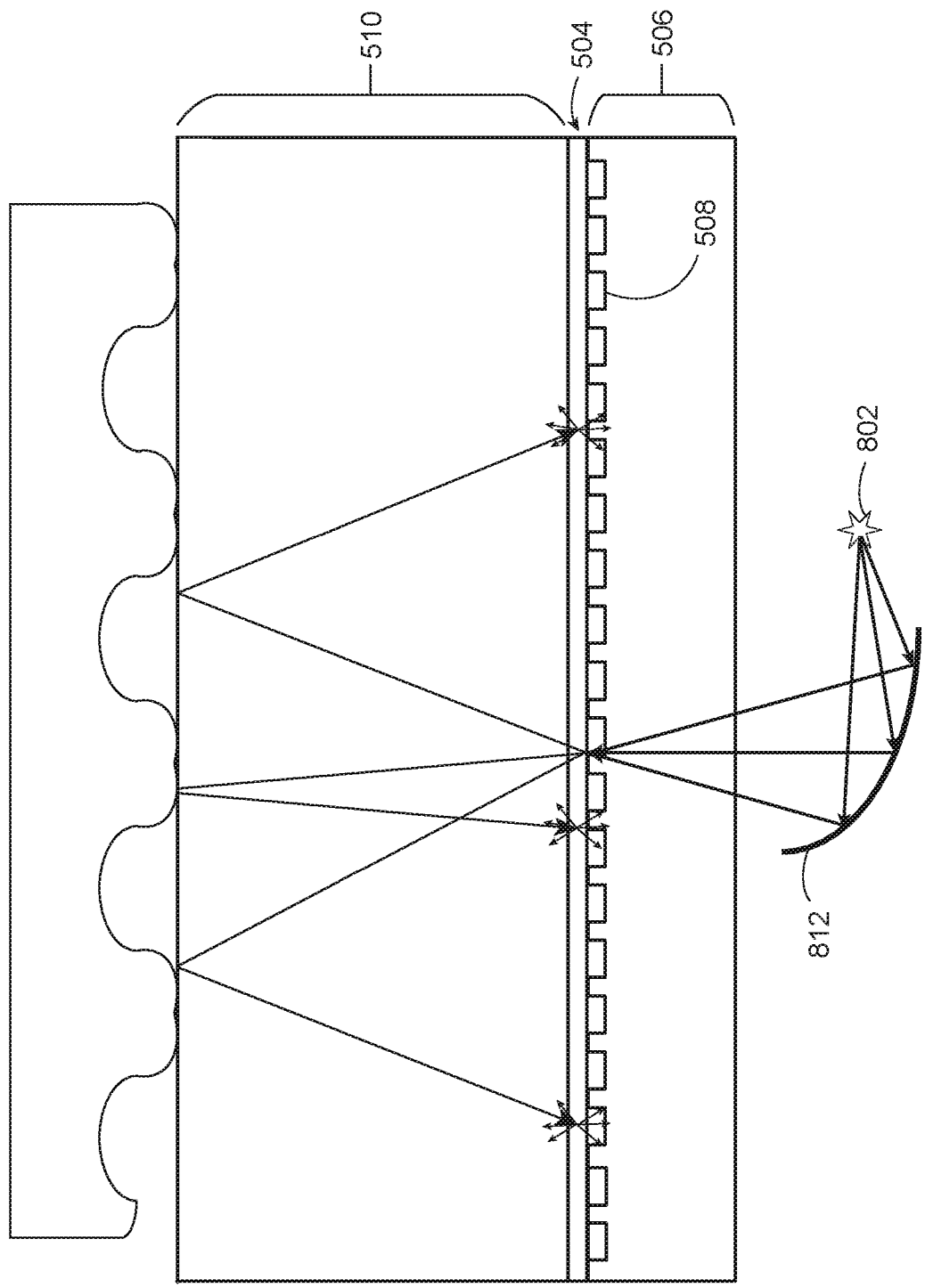

FIGS. 7-8 show light being focused onto the scattering layer 504 with one or more lenses, according various embodiments. The focusing can be achieved by refractive, diffractive, or reflective optical elements, or a combination of optical elements. In FIG. 7, a light source 702 directs light onto a converging lens 712, which causes the light to refract and come together at a focal point at or near the scattering layer 504. In FIG. 8, a light guide 812 may have a total internal reflecting design to direct light from a light source 802 onto a small area of the scattering layer 504.

Figure 9:
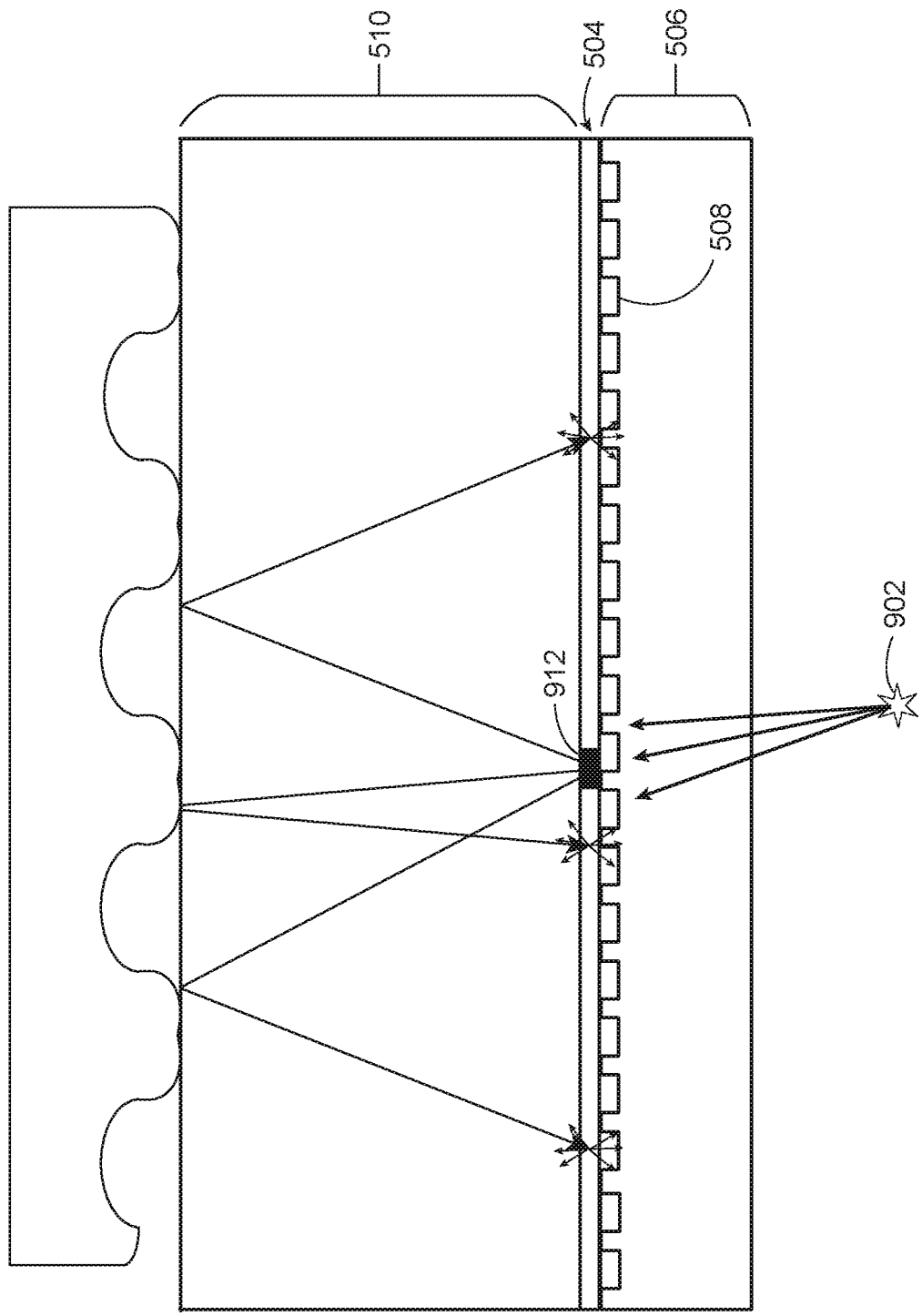
FIG. 9 shows an ultraviolet light source exciting a fluorescent emitter located near the sensor, according to one embodiment.

FIG. 9 shows an excitatory light source, such as ultraviolet light source 902, exciting a fluorescent emitter 912 located near the sensor 508, according to one embodiment. The fluorescent emitter 912 may be in the same plane as the scattering layer 504 (as shown), below the scattering layer 504, or above the scattering layer 504. Optionally, a color filter may be placed over the sensor substrate 506 so that the ultraviolet light from the ultraviolet light source 902 cannot enter the detector pixels 508. The embodiment shown in FIG. 9 may be useful in implementations using an invisible illumination scheme. In one example, the ultraviolet light from ultraviolet light source 902, and the fluorescence emitted by fluorescent emitter 912 could be in the near-infrared spectrum, both of which are invisible. Alternatively, either or both of the wavelengths of the excitatory light and the emitted light could be visible. This approach may be combined with other methods, such as focusing the illuminating wavelength onto a small spot with fluorescent properties.

As described in greater detail below, an image of a partial fingerprint (i.e., if the sensing area is smaller than the finger) may be generated using implementations shown in FIGS. 2-9. Similar configurations may be repeated at multiple locations along the sensor substrate, resulting in multiple partial fingerprint images. The multiple partial fingerprint images can be combined to form a combined image.

Figure 10:
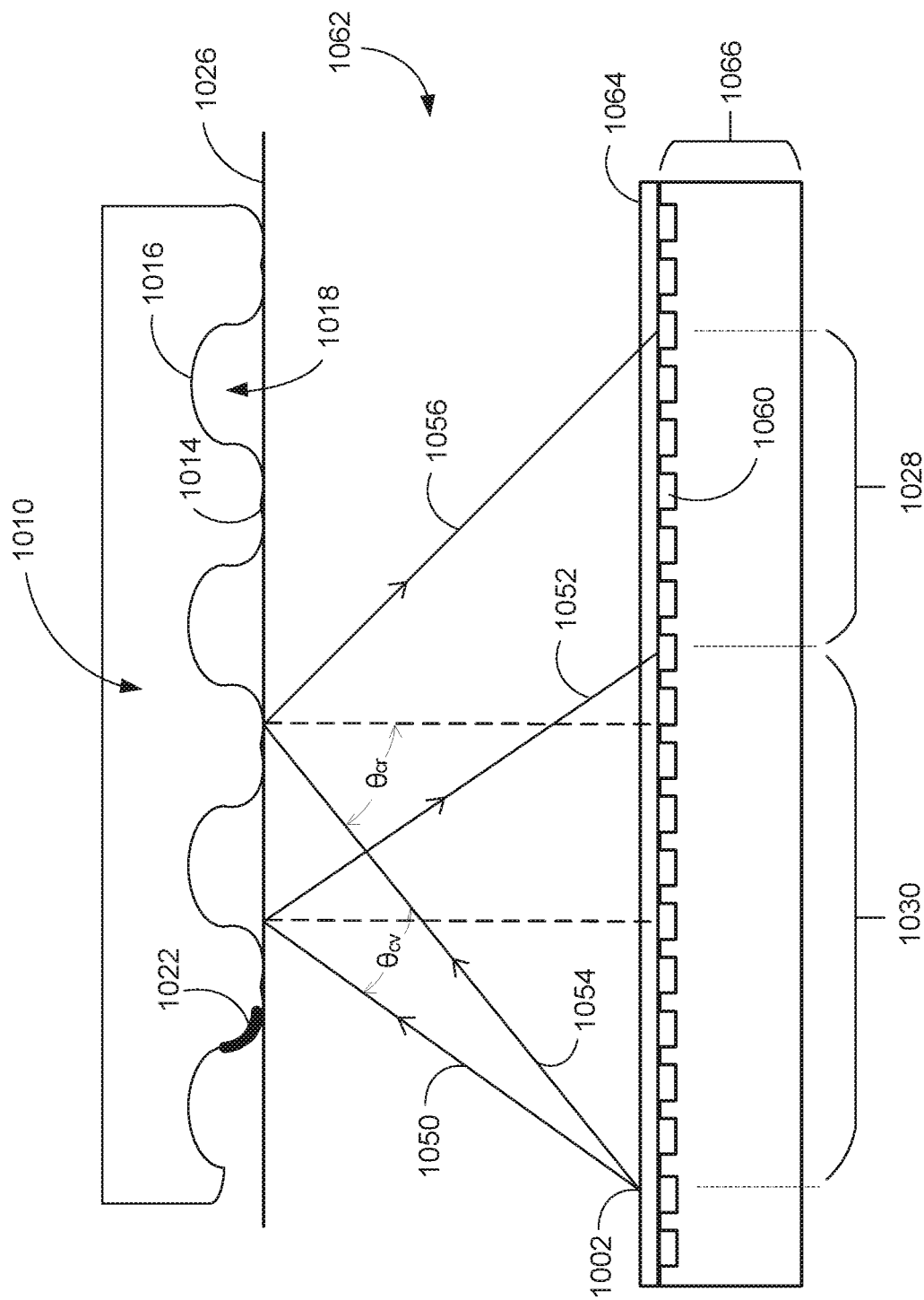
FIG. 10 illustrates light beams emanating from a point light source at different angles resulting in an image of a partial fingerprint, according to an embodiment of the disclosure.

FIG. 10 illustrates light beams emanating from a point light source 1002 at different angles resulting in an image of a partial fingerprint, according to an embodiment of the disclosure. A sensor substrate 1066 includes detector pixels 1060. A scattering layer 1064 is disposed above the sensor substrate 1066. A cover layer 1062 is disposed above the scattering layer 1064. The point light source 1002 can be achieved using any of the embodiments shown in FIGS. 2-9.

As will be appreciated, since the medium (i.e., input object or air) above the sensing surface 1026 varies, the critical angle $\theta_c$ at various points along the sensing surface 226 may likewise vary. For example, the ridges 1014 of the input object 1010 and gaps 1018 formed within the valleys 1016 of the input object 1010 may have different indices of refraction. As a result, different critical angles may exist at the boundaries between the sensing surface 1026 and ridges 1014 as compared to the boundaries formed by the air gaps 1018 and the sensing surface 1026. These differences are illustratively shown in FIG. 10. Line 1050 represents a beam of light transmitted from the point light source 1002 at the critical angle ($\theta_{cv}$) for a gap 1018 and sensing surface 1026 boundary, and line 1052 represents the corresponding reflected beam. Line 1054 represents a beam of light transmitted at the critical angle ($\theta_{cr}$) for a ridge 1014 and sensing surface 1026 boundary, and line 1056 represents a corresponding reflected beam. Relative to point light source 1002, region 1028 depicts an area on the substrate 1066 that is bounded by reflected light resulting from light beams transmitted at the critical angles $\theta_{cv}$ and $\theta_{cr}$, or in other words is bounded by reflected beams 1052 and 1056.

In accordance with one aspect of the disclosure, detector pixels 1060 falling within region 1028 are used to detect reflected light 1052, 1056 to image part of input object 1010 when point light source 1002 is illuminated. With respect to the detection of ridges 1014 and valleys 1016, region 1028 is an area of relatively high contrast. The relative high contrast occurs because light reflected from the sensing surface 1026 in contact with valleys (e.g., air) undergoes total internal reflection whereas light reflected from the sensing surface 1026 in contact with the input object 1010 (e.g., skin) does not. Thus, light beams transmitted from point light source 1002 which have an angle of incidence at the sensing surface 1026 falling between $\theta_{cv}$ and $\theta_{cr}$ are reflected and reach detector pixels 1060 falling within region 1028.

In accordance with another aspect of the disclosure, detector pixels 1060 falling within region 1030 (relative to point light source 1002) may also be used to image the input object 1010. In particular, transmitted beams from point light source 1002 that become incident on the sensing surface 1026 with angles smaller than both critical angle of ridge ($\theta_{cr}$) and critical angle of valley ($\theta_{cv}$) result in reflected beams falling within region 1030. Due to scattering, the contrast of reflected beams falling within region 1030 from ridges and valleys may be less than the contrast of reflected beams falling within high contrast region 1028. However, depending on the sensitivity of the detector pixels and resolution requirements, region 1030 may still be suitable for sensing ridges and valleys on the input object 1010. Moreover, region 1030 will generally be suitable for detecting non-structural optical variations in the input object 1010 such as stains or ink 1022.

It will be appreciated that the reflected light beams detected in region 1028 provide a magnified view of a partial image of the input object 1010 due to the angles of reflection. The amount of magnification depends upon the distance between the point light source 1002 and the sensing surface 1026 as well as the distance between the detector pixels 1060 and the sensing surface 1026. For example, if the point light source 1002 and the detector pixels 1060 are coplanar, then the distance between the point light source 1002 and the sensing surface 1026 may be equivalent or nearly equivalent to the distance between the detector pixels 1060 and the sensing surface 1026. In such a case, the partial image of the input object 1010 may undergo a two-time magnification (2×) based on a single internal reflection from the sensing surface 1026 reaching the detector pixels 1060 in region 1028 or 1030.

The critical angles $\theta_{cr}$ and $\theta_{cv}$ resulting from ridges 1014 and gaps 1018 at the sensing surface 1026 are dependent on the properties of the medium in contact with the boundary formed at the sensing surface 1026, which may be affected by a condition of the input object 1010. For example, a dry finger in contact with the sensing surface may result in a skin to air variation across the sensing surface corresponding to fingerprint ridges and valleys, respectively. However, a wet finger in contact with the sensing surface may result in a skin to water or other liquid variation across the sensing surface. Thus, the critical angles of a wet finger may be different from the critical angles formed by the same finger in a dry condition. Thus, in accordance with the disclosure, the intensity of light received at the detector pixels can be used to determine the relative critical angles, determine whether the object is wet or dry and/or adjust the detector pixels used for capturing the image of the object. If a wet object is detected, a user may also be notified so that the object can be dried before imaging.

Figure 11:
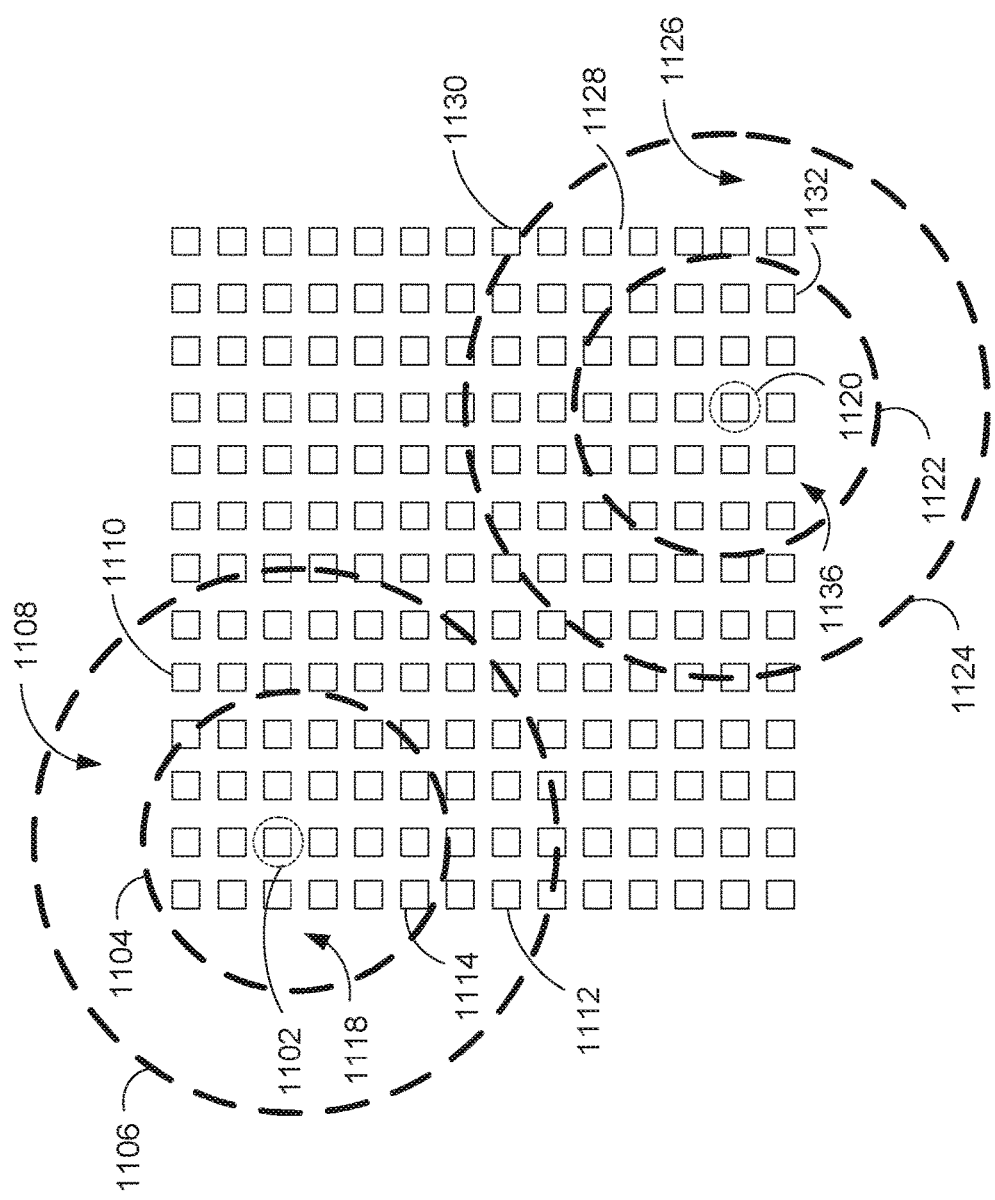
FIG. 11 illustrates a plan view of an example of detector pixels of an optical sensing system, according to one embodiment.

FIG. 11 illustrates a plan view of an example of detector pixels of an optical sensing system, according to one embodiment. In the example, a small area 1102 of a scattering layer is illuminated, and light is scattered by the scattering layer. The small area 1102 (i.e., light scattering area) of the scattering layer can be illuminated through an aperture by a light source placed in or near the layer of detector pixels, or the small area can be illuminated by a scattering layer acting as a point light source, as described above.

Concentric circles 1104 and 1106 illustrate boundaries of a high contrast region 1108, which as described above may depend on the dimensions of the display as well as the critical angles $\theta_{cr}$ and $\theta_{cv}$.

In certain embodiments, when small area 1102 is illuminated, detector pixels falling within the high contrast region 1108, such as detector pixels 1110 and 1112 are used to detect reflected light from the input object to image a portion of the input object. In other embodiments, or in combination with the collection of data from region 1108, detector pixels, such as detector pixels 1114 falling within region 1118, i.e., a relatively lower contrast region, may be used.

Also shown in FIG. 11 is a second small area 1120 of the scattering layer that is illuminated. Concentric circles 1122 and 1124 illustrate boundaries of a second high contrast region 1126, which corresponds to the second small area 1120. Detector pixels within region 1126, such as detector pixels 1128 and 1130, are used to collect data corresponding to the object to be imaged. In other embodiments, or in combination with the collection of data from region 1126, detector pixels, such as detector pixel 1132 falling within region 1136, i.e., a relatively lower contrast region, may be used.

In the example of FIG. 11, high contrast region 1108 and high contrast region 1126 are non-overlapping. It will be understood, however, that regions 1108 and 1136 may overlap. In the case of overlapping high contrast regions, the illuminated small areas 1102 and 1120 may be illuminated at different times, as discussed in connection with FIGS. 12A-12B below. In an alternate embodiment, the light transmitted from small area 1102 can be distinguished from the light transmitted from small area 1120 (e.g., by using different wavelengths of light), in which case data is collected simultaneously within their respective high contrast regions. When small areas 1102 and 1120 are simultaneously illuminated as part of object imaging, FIG. 11 provides an example of object imaging using a spatial pattern.

It will be understood that FIG. 11 illustrates the illumination of small areas and each small area includes corresponding detection regions with which data is collected for partial images of the input object. In operation, the system and method contemplate the illumination of as many display pixels as necessary to capture enough partial images to make up a larger image, or complete image of the object. It will also be understood that various small areas may be independently used for displaying visual information simultaneously while selected pixels are illuminated for object imaging.

Figure 12B:
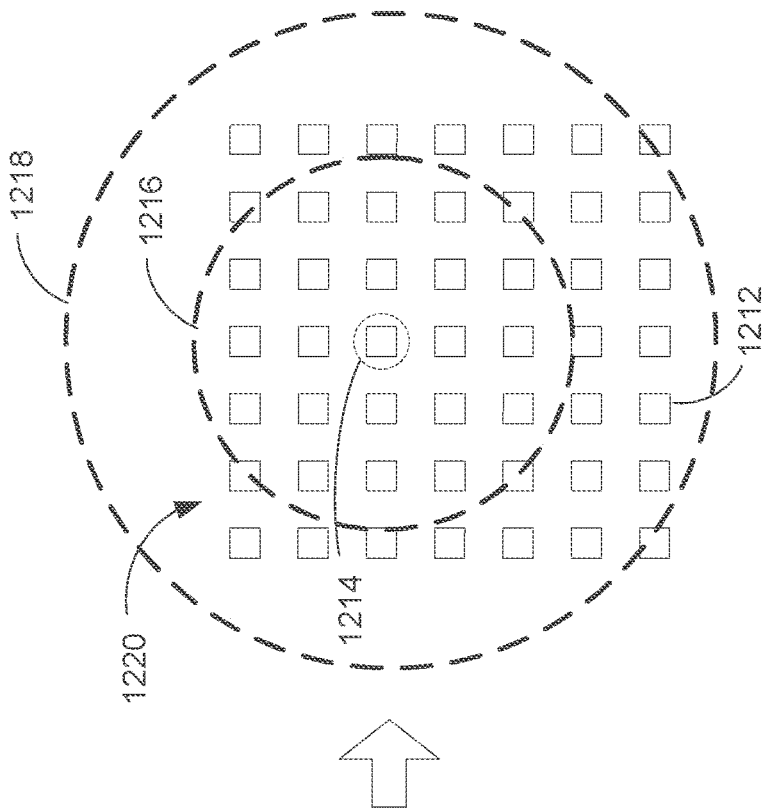
FIGS. 12A-12B show an example of detector pixels using a temporal pattern of illumination, according to the present disclosure.
Figure 12A:
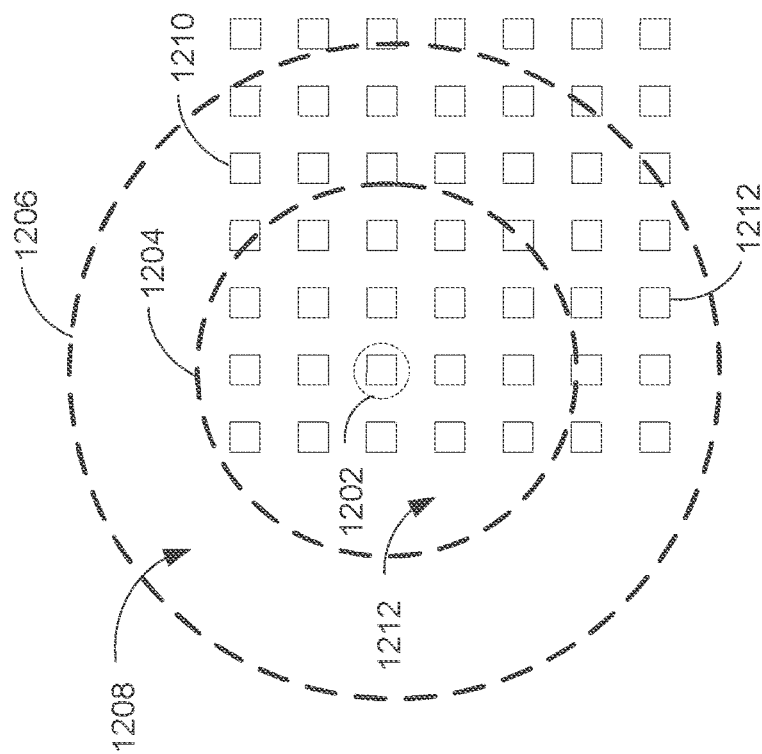

FIGS. 12A-12B show an example of detector pixels using a temporal pattern of illumination, according to the present disclosure. In FIG. 12A, a small area 1202 of a scattering layer is illuminated. Concentric circles 1204 and 1206 identify the boundaries of high contrast area 1208 corresponding to small area 1202. Thus, according to the disclosure, detector pixels within the high contrast area 1208, such as detector pixels 1210 and 1212, are used to collect data corresponding to ridges and valleys, or other surface features, from the object 212 to be imaged. Alternatively, or in combination with the foregoing, detector pixels within region 1212, which is radially inward from boundary 1204, may be used.

FIG. 12B represents the same set of detectors pixels as FIG. 12A, but at a different time. Small area 1214 of the scattering layer is illuminated. As will be noted, the concentric circles 1216 and 1218 identifying the boundaries of corresponding high contrast region 1220 have moved relative to the high contrast region 1208 of FIG. 12A. Thus, the subset of detector pixels falling in the high contrast area have changed, although some pixels may fall with both high contrast areas 1208 and 1220, such as detector pixel 1222.

In the example of FIGS. 12A and 12B, the various high contrast regions 1208 and 1220 overlap. However, illumination of the small areas 1202 and 1214 are temporally spaced. For example, small area 1202 is illuminated. After the data is collected from within region 1208, small area 1202 ceases to be illuminated. Small area 1214 is then illuminated and data is collected from within region 1220. After data is collected from within region 1220, small area 1214 ceases to be illuminated. This process continues using as many display pixels as necessary to capture enough partial images to form a larger or complete image of the input object as desired. As previously described, the disclosure also contemplates the simultaneous illumination of multiple small areas having overlapping high contrast areas provided that the reflected light received from the different illumination pixels can be resolved.

Figure 13:
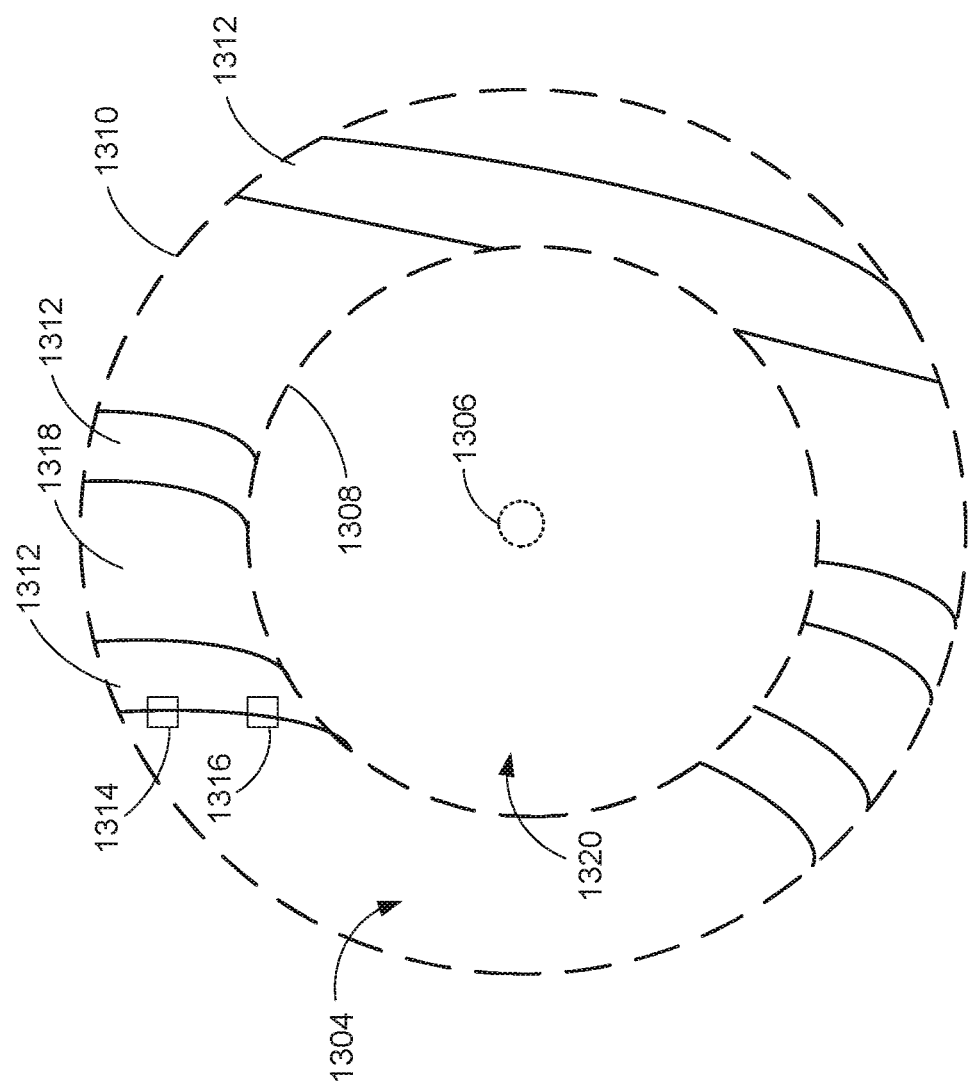
FIG. 13 illustrates a plan view of a partial image of an object superimposed onto a high contrast region, which is imaged during illumination of a small area, according to one embodiment.

FIG. 13 illustrates a plan view of a partial image of an object superimposed onto a high contrast region 1304, which is imaged during illumination of a small area 1306, according to one embodiment. Concentric circles 1308 and 1310 show the boundaries of the high contrast region 1304. Portions 1312 correspond to ridges of the input object. Other areas within the high contrast region 1304 correspond to valleys 1318 of the input object. As previously described, due to the angles of reflection undergone by light transmitted from small area 1306, the ridges and the valleys detected in the high contrast region 1304 are magnified as compared the actual ridges and valleys on the object. The amount of magnification depends on the geometry of the optical sensing system, including the distance between the light source (e.g., the scattering layer), detector pixels, and the sensing region. Moreover, detector pixels further away from the small area 1306, e.g., detector pixel 1314, will receive lower intensity reflected light as compared to detector pixels closer to the display small area 1306, e.g., detector pixel 1316 because the intensity of light decreases in relation to the distance it travels.

In some applications, image data from various partial images obtained during illumination of the individual small areas is combined into composite image data of the input object. The partial image data may be aligned based on known spatial relationships between the individual small areas in the pattern. By way of example, the partial image data may be combined by stitching together the partial images into a larger image, or by generating a map that relates the image data from the various partial images according to their relative alignments. Demagnification of the images may be useful prior to such piecing together or mapping. In addition, it may be useful to apply a weighting function to the image data to account for the different intensities of light received at detector pixels having different distances from the individual small areas. In some applications, if pixels inside of region 1320 are used, the resulting data from the various partial images may be deconvolved to reconstruct the larger image. Alternatively, the data inside of this region may convey sufficient information for some applications, so that no deconvolution is needed.

Figure 14:
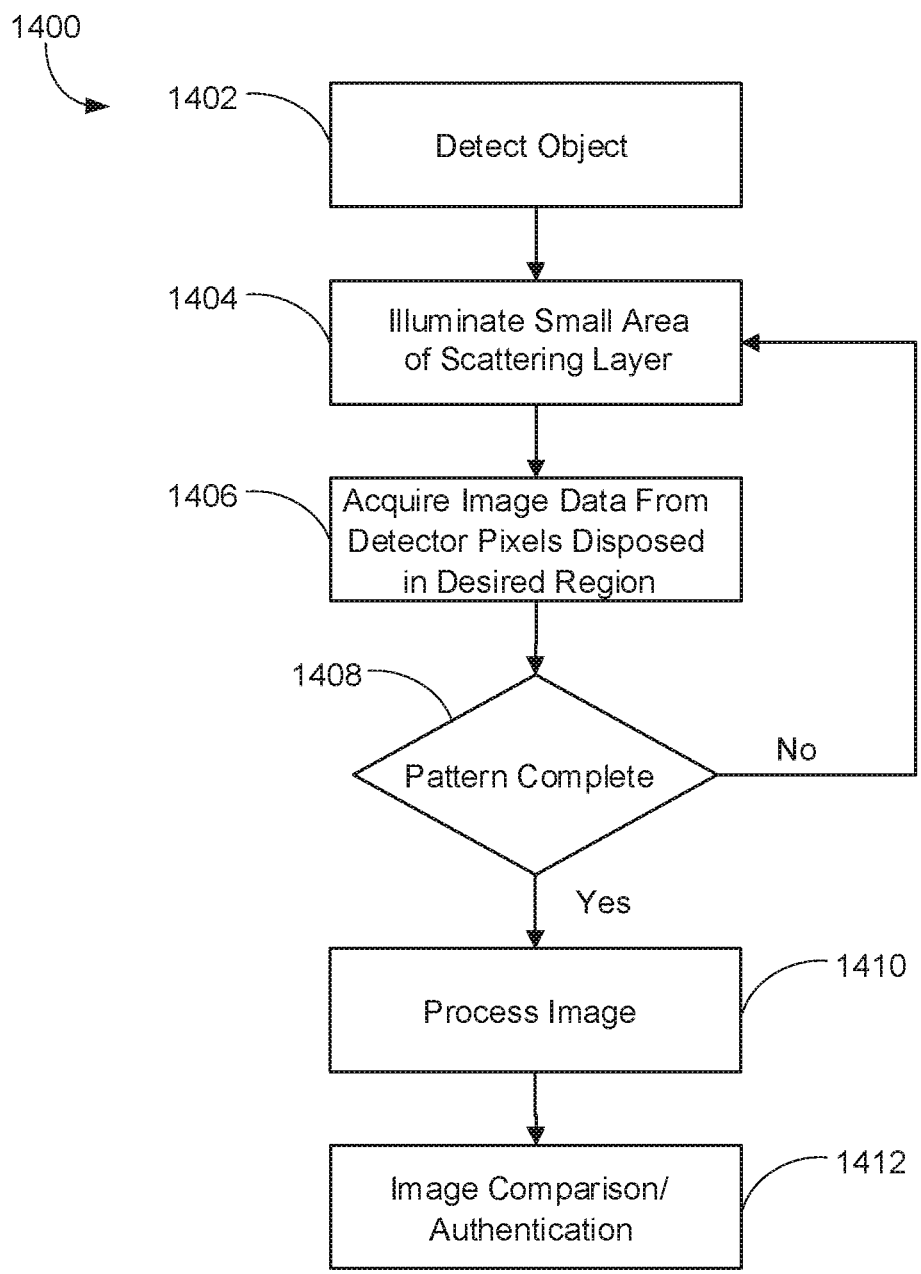
FIG. 14 illustrates a method of obtaining, processing and performing matching of an image of an input object, such as a fingerprint, according to one embodiment.

FIG. 14 illustrates a method 1400 of obtaining, processing, and performing matching of an image of an input object, such as a fingerprint, according to one embodiment. The method may be performed by a processing system. By way of example, matching may be used for biometric authentication or biometric identification. It will be appreciated that the steps and sequence of steps are by way of example only. Steps may be eliminated or the sequence modified without departing from the system and method of the present disclosure.

In step 1402, the presence of an input object in a sensing region (for example, in contact with a sensing surface) is detected. Such detection may occur, for example, as the result of detection of changes of intensity in light received at detector pixels. Alternatively, presence of the input object may be detected via capacitive sensing or other techniques.

In step 1404, one or more small areas of a scattering layer are illuminated to image the input object. In one embodiment, a substrate on which detector pixels are located comprises a separate layer than the scattering layer. In another embodiment, a substrate on which detector pixels are located comprises the scattering layer, and a separate scattering layer is not provided. In one embodiment, the one or more small areas are illuminated via apertures in a scattering layer. In other embodiments, the scattering layer does not include an aperture, and light is scattered from a small area of the scattering layer, thereby the small area mimics a point light source. The small areas illuminated and the sequence of illumination depend on the pattern used. For example, if a spatial pattern is used, multiple spatially separated small areas are simultaneously illuminated. If a temporal pattern is used, small areas are illuminated at different times. In some embodiments, the pattern may include a combination of temporal and spatial patterns. For example, a first set of small areas may be illuminated where the corresponding high contrast areas are non-overlapping. A second set of small areas may then be illuminated to provide non-intersecting high contrast regions and so on. The small areas illuminated and sequence of illumination may also be guided by a touch position detected by capacitive sensors, for example.

In some embodiments, multiple small areas may be illuminated to provide overlapping high contrast areas. In such an arrangement, the small areas may transmit light of different wavelengths (e.g., colors), which can be separately detected to resolve different partial images of the object. Alternatively, techniques such as code division multiplexing may be used to transmit the light. In such an arrangement, the collected data may be de-convolved to resolve the different subparts of the fingerprint. Other methods to distinguish between light transmitted from different small areas may be used provided that light transmitted from different small areas can be detected and distinguished.

In step 1406, image data is obtained from appropriate detector pixels, for example, detector pixels in the corresponding high contrast region(s) for the illuminated small area(s).

In step 1408, a determination is made as to whether the pattern is complete. The pattern is complete when data for each of the partial images that will make up the entirety of a desired image of the object is collected. If the pattern is not complete, the process returns to step 1404. In step 1404, the next sequence in the process is initiated, for example, the next small area or set of small areas is illuminated.

In step 1410, the collected data for the various partial images undergo processing. By way of example, the processing may include demagnification of the image data and/or the application of weighting factors to the image data to account for the different intensities of light detected at detector pixels further away from the small areas. The processing may further include combining the data for the various partial images into a complete image or creating a template that relates the partial images to one another even though they are kept separate. The image data from the various partial images may be combined according to the known geometric relationships between the pixels in the pattern. The image data may also be combined based on other parameters, such as the thickness of the cover layer, which provides additional information about the light beam paths from the illumination and detector pixels to the sensing surface to resolve physical transformations between the partial images. The thickness of the cover layer may be pre-defined or may be computed at image capture time based on the location of the inner boundary of the high contrast region. For example, the location of the inner boundary may be closer or further away from the illuminated display pixel for thinner or thicker cover layers, respectively. In one embodiment, the processing is performed by a processor included in the sensor. In other embodiments, the processing is performed by a processor external to the sensor and communicatively coupled to the sensor (e.g., a processor included in a device, such as phone, in which the sensor is located).

In step 1412, the image data may be compared to previously stored images of the object. For example, an image of a fingerprint taken during an authentication attempt may be compared to previously stored enrollment views of the fingerprint. If a match is detected, the user is authenticated. If a match is not detected, authentication may be denied. As another example, an image of a fingerprint taken during a control input may be compared to previously stored enrollment views of the fingerprint to identify which finger provided the input. If a match is detected to a specific finger, a finger specific display response or other device operation may then be initiated based on the identified finger.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. For example, although a system and method are described for imaging an input object using a display, the system and method can be implemented as an imager that is separate from the display. Moreover, although the description is generally directed to imaging a fingerprint, the system and method may be used to image any object. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An optical sensor, comprising:
   a sensor substrate comprising detector pixels;
   a scattering layer;
   a cover layer including a sensing surface, wherein the scattering layer is disposed between the sensor substrate and the cover layer, wherein the scattering layer has a thickness that is the same or less than a pitch of the detector pixels; and
   a light source;
   wherein the optical sensor is configured to:
      illuminate the light source causing light beams to emanate from the light source and arrive at the scattering layer at a spot, wherein the light beams travel from the spot through the scattering layer in a range of angles to produce an effect of a point light source originating at the spot; and
      acquire image data, from one or more detector pixels, of an input object in contact with the sensing surface, wherein the image data corresponds to light from the light source that is reflected at the sensing surface of the cover layer, wherein the one or more detector pixels are in a region of the optical sensor that, relative to a location of the point light source at the scattering layer, is bounded by reflected light resulting from light beams transmitted at a critical angle $\theta_{cr}$ corresponding to the input object in contact with the sensing surface and reflected light resulting from light beams transmitted at a critical angle $\theta_{cv}$ corresponding to no object in contact with the sensing surface.

2. The optical sensor of claim 1, wherein the light that is reflected at the sensing surface of the cover layer is scattered by the scattering layer prior to reaching the detector pixels.

3. The optical sensor of claim 1, wherein the light source comprises a laser that directs a beam of light towards the scattering layer.

4. The optical sensor of claim 1, wherein the light source comprises a micro LED disposed in the same plane as the detector pixels.

5. The optical sensor of claim 1, wherein the light source is configured to cause light beams to emanate from different portions of the scattering layer according to pattern so that the optical sensor is able to acquire image data of different portions of the input object.

6. The optical sensor of claim 1, wherein the scattering layer comprises a white paint layer.

7. The optical sensor of claim 1, wherein the light source directs light onto an optical element that causes the light to refract at the optical element to come together at a focal point at the scattering layer.

8. The optical sensor of claim 1, wherein the light source comprises an ultraviolet light source, and wherein a fluorescent emitter is included at the spot in the scattering layer, such that the ultraviolet light source directs light onto the fluorescent emitter.

9. An electronic device for imaging an input object, comprising:
   a sensor comprising:
      a sensor substrate comprising detector pixels;
      a scattering layer disposed on the sensor substrate, wherein the scattering layer has a thickness that is the same or less than a pitch of the detector pixels;
      a cover layer, wherein the cover layer is disposed on the scattering layer; and
      a light source;

a memory storing instructions; and a processor communicatively coupled to the sensor, wherein the processor is configured to execute the instructions to cause the electronic device to:

cause light beams to emanate from the light source and arrive at the scattering layer at a spot, wherein the light beams travel from the spot through the scattering layer in a range of angles to produce an effect of a point light source originating at the spot;

acquire image data, from one or more detector pixels, of the input object in a sensing region above the cover layer, wherein the image data corresponds to light from the light source that travelled through the scattering layer and is reflected at a surface of the cover layer, wherein the one or more detector pixels are in a region of the sensor that, relative to a location of the point light source at the scattering layer, is bounded by reflected light resulting from light beams transmitted at a critical angle $\theta_{cr}$ corresponding to the input object in contact with the sensing surface and reflected light resulting from light beams transmitted at a critical angle $\theta_{cv}$ corresponding to no object in contact with the sensing surface; and process an image of the input object from the image data.

10. The electronic device of claim 9, wherein the light that is reflected at the surface of the cover layer is scattered by the scattering layer prior to reaching the detector pixels.

11. The electronic device of claim 9, wherein the light source comprises a laser that directs a beam of light towards the scattering layer.

12. The electronic device of claim 9, wherein the light source comprises a micro LED disposed in the same plane as the detector pixels.

13. The electronic device of claim 9, wherein the light source comprises an ultraviolet light source, and wherein a fluorescent emitter is included at the spot in the scattering layer, such that the ultraviolet light source directs light onto the fluorescent emitter.

14. The electronic device of claim 9, wherein the light source is configured to cause light beams to emanate from different portions of the scattering layer according to pattern so that the processing system is able to acquire image data of different portions of the input object.

15. The electronic device of claim 9, wherein the scattering layer has a thickness of 100um or less.

16. The electronic device of claim 9, wherein the scattering layer comprises a white paint layer.

17. A method for imaging an input object, comprising:

detecting the presence of the input object on a sensing surface of a cover layer of a sensor;

illuminating a light source to cause light beams to emanate from the light source and arrive at a scattering layer of the sensor at a spot, wherein the light beams travel from the spot through the scattering layer in a range of angles to produce an effect of a point light source originating at the spot;

acquiring image data, from one or more detector pixels of the sensor, of the input object in contact with the sensing surface, wherein the image data corresponds to light from the area of the scattering layer that is illuminated that is reflected at the sensing surface of the cover layer, wherein the one or more detector pixels are in a region of the sensor that, relative to a location of the point light source at the scattering layer, is bounded by reflected light resulting from light beams transmitted at a critical angle $\theta_{cr}$ corresponding to the input object in contact with the sensing surface and reflected light resulting from light beams transmitted at a critical angle $\theta_{cv}$ corresponding to no object in contact with the sensing surface, wherein the scattering layer has a thickness that is the same or less than a pitch of the one or more detector pixels; and processing an image of the input object from the image data.

18. The method of claim 17, wherein the scattering layer comprises a substrate on which the one or more detector pixels are located.

19. The method of claim 17, wherein the light that is reflected at the sensing surface of the cover layer is scattered by the scattering layer prior to reaching the detector pixels.

20. The method of claim 17, wherein the scattering layer comprises a white paint layer.

21. The method of claim 17, wherein the scattering layer comprises a polymer dispersed liquid crystal (PDLC) stackup including two transparent conductor layers and a PDLC film disposed between the two transparent conductor layers, wherein in a first state, the PDLC film has a colored or opaque appearance, and wherein in a second state, the PDLC film is transparent to create the aperture of the scattering layer.

* * * * *